United States Patent
Lermusiaux

[15] 3,644,070
[45] Feb. 22, 1972

[54] COOLING CIRCUIT FOR ROTARY PISTON INTERNAL COMBUSTION ENGINES

[72] Inventor: Lucien Lermusiaux, Saint-Etienne, France

[73] Assignee: Societe De Construction et D'Exploitation De Materiels et Moteurs S.C.E.M.M., Paris, France

[22] Filed: Sept. 30, 1969

[21] Appl. No.: 862,336

[30] Foreign Application Priority Data

Sept. 30, 1968 France....................................168221

[52] U.S. Cl..............................................418/61, 418/83
[51] Int. Cl......................F01c 21/06, F01c 1/02, F01c 21/10
[58] Field of Search................418/61, 83, 85, 88; 123/8 CC

[56] References Cited

UNITED STATES PATENTS

| 3,007,460 | 11/1961 | Bentele et al. | 418/83 |
| 3,102,516 | 9/1963 | Gist et al. | 418/83 |
| 3,319,612 | 5/1967 | Hamada | 418/83 |
| 3,323,501 | 6/1967 | Balve | 418/83 |

Primary Examiner—Carlton R. Croyle
Assistant Examiner—John J. Vrablik
Attorney—Fleit, Gipple & Jacobson

[57] ABSTRACT

The casing comprises a peripheral envelope having an inlet orifice, an exhaust orifice and spark plug wells. This envelope is cooled in its hot zone by a liquid circulating in a part of the cooling circuit. The successive cross sections of that part of the circuit are such that, at each cooled point of the envelope, the thermal exchanges take place in conditions of convection situated in the range 10° to 20° C. below the beginning of the nuclear ebullition conditions.

6 Claims, 10 Drawing Figures

INVENTOR
LUCIEN LERMUSIAUX
BY
Fleit, Gipple & Jacobson
ATTORNEYS

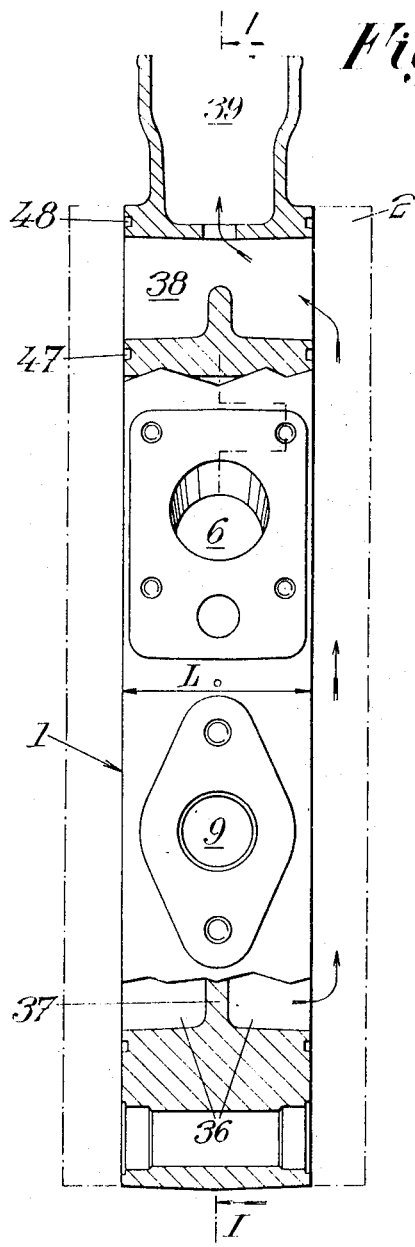
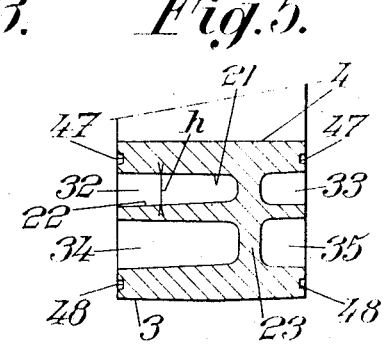
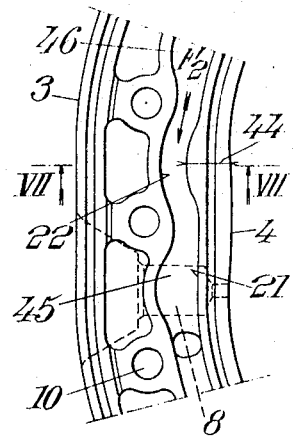
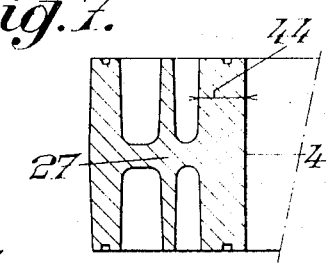
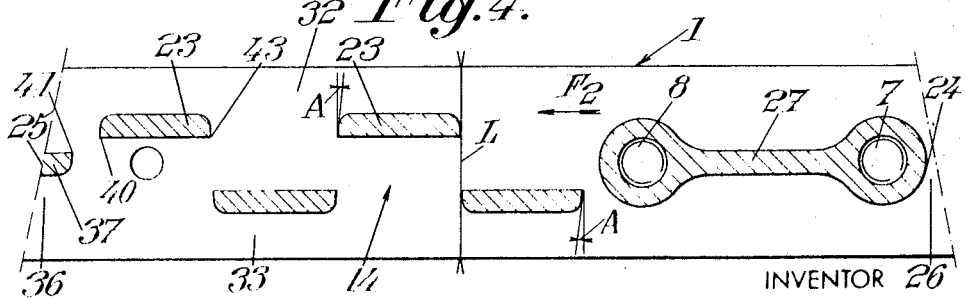
INVENTOR
LUCIEN LERMUSIAUX

3,644,070

COOLING CIRCUIT FOR ROTARY PISTON INTERNAL COMBUSTION ENGINES

This invention relates to circuits for cooling by liquid, in particular for the casing of a rotary piston internal combustion engine, the casing being constituted by a peripheral envelope and lateral cheeks.

These circuits are of the type that comprises a pump adapted to make the liquid circulate, along the periphery of the envelope, in an active part of the circuit inside of the envelope, at speeds varying locally as a function of the heat flux to be evacuated, and a radiator for dispersing to the exterior the heat carried away by the liquid.

The invention is more particularly, but not exclusively, concerned with the circuits of this type that are intended for engines whose casing comprises an envelope having an inner surface, in profile, in the form of a trochoid, and whose rotary piston comprises a number of arcs greater by one unit than that of the said surface.

It is known that different heat fluxes are transmitted to the different zones of the casing of a rotary piston internal combustion engine. Irregularly distributed heating can result such that certain zones of the casing become much hotter than others and dangerous thermal stresses then appear in the casing. These stresses can be avoided, or at least reduced, by making the cooling liquid circulate faster in the zones where the heat fluxes to be evacuated are large so as to favour the thermal exchanges there and reduce the heating there. The increase of the speed of the liquid, whose flow rate is constant, is obtained by decreasing the cross section of the passage offered to this liquid and vice versa.

Furthermore, it is known that a liquid at constant pressure $\pi$, at a substantially constant temperature lower than the temperature of ebullition of the liquid under the pressure $\pi$, circulating in contact with a hot wall at a constant speed, exchanges heat with this wall according to a determined law. In a system of rectangular logarithmic coordinates in which the ordinate represents the flux density of exchanged heat $\Phi/A$ (also called unitary flux and generally expressed in watts per m.$^2$) and the abscissa represents the temperature difference $\Delta T$ between the hot wall and the liquid, the transmission law is represented by a curve having the following four parts:

A first part, for which the temperature difference $\Delta T$ is lower than a value $\Delta T_1$, has a relatively low positive slope. The heat exchanges take place practically entirely by convection.

A second part, for which the temperature difference $\Delta T$ is between $\Delta T_1$ and $\Delta T_2$ ($\Delta T_2$ being greater than $\Delta T_1$), has a relatively steep positive slope. A point on the curve, P, of abscissa $\Delta T_1$, marks the passage from the first part to the second part of the curve. The heat exchanges corresponding to this second part take place practically entirely by nuclear ebullition.

A third part, for which the temperature difference $\Delta T$ is between $\Delta T_2$ and $\Delta T_3$ ($\Delta T_3$ being greater than $\Delta T_2$), has a relatively low negative slope, and the type of thermal exchange corresponds to a transition-type. An arc having a tangent parallel to the abscissa axis, at a point of tangency $\theta$ of abscissa $\Delta T_2$, connects the second and third parts of the curve.

Finally, a fourth part, for which the temperature difference $\Delta T$ is greater than $\Delta T_3$, has a slope which is again positive, and the type of thermal exchange corresponds to film vaporization.

It will be appreciated that an operating point on the second part of the curve, in the neighborhood of the point $\theta$, does not provide security: for, to a small increase of the density of the flux transmitted, which is nevertheless sufficient to exceed the ordinate of the point $\theta$, is going to correspond a large increase of the temperature difference $\Delta T$ which passes from a value in the neighborhood of $\Delta T_2$ to a value greater than $\Delta T_3$. Thus there can be produced locally, even if the flux to be transmitted only increases slightly, abrupt increases in the temperature of the wall which generate large thermal stresses.

An object of this invention is to provide such cooling circuits in which the security of the thermal exchanges between the casing and the cooling liquid is satisfactory.

In accordance with the principal feature of this invention, in cooling circuits of the type in question, the successive cross sections of the active part of the circuit inside the envelope of the casing are determined such that, taking into account the characteristics of the liquid, the pump and the radiator, the thermal exchanges take place, during normal operation and at any cooled point of the envelope, substantially by convection, with the temperature difference between the envelope of the casing and the liquid, at each point of the envelope, smaller by a substantially constant value than the temperature difference corresponding to the passage from convection to nuclear ebullition. This constant value is, preferably, between 10° and 20° C.

According to a preferred embodiment, the active part of the circuit inside the envelope is arranged in the form of a passage of the casing in the envelope of the casing, in the neighborhood of its inner surface, and comprised between two cylindrical surfaces, the first of which is substantially parallel to the aforesaid inner surface and the second of which surrounds the first at a distance depending on the cross section of the passage, these two cylindrical surfaces being joined together by ribs which are substantially parallel to the mean plane perpendicular to the generatrixes of those cylindrical surfaces and which are disposed in quincunx with respect to that plane, the cheeks limiting that passage laterally.

The invention will in any case be able to be well understood from the following complementary description and the accompanying drawings, which complementary description and drawings relate to a preferred embodiment.

In these drawings:

FIG. 3 represents the same envelope seen from the left and in partial section, along III—III of FIG. 1;

FIG. 4 represents a section made along IV—IV of FIG. 1 of the active part of the cooling circuit;

FIG. 5 represents the envelope in section along V—V of FIG. 1;

FIG. 6 represents a rear view, seen from the rear of FIG. 1, of a part of the envelope comprising the housings for the spark plugs;

FIG. 7 is a section along VII—VII of FIG. 6;

First of all, with respect to the casing as a whole, it comprises an envelope 1 (FIG. 1) and lateral cheeks 2 represented schematically in FIG. 3.

Figure 1:
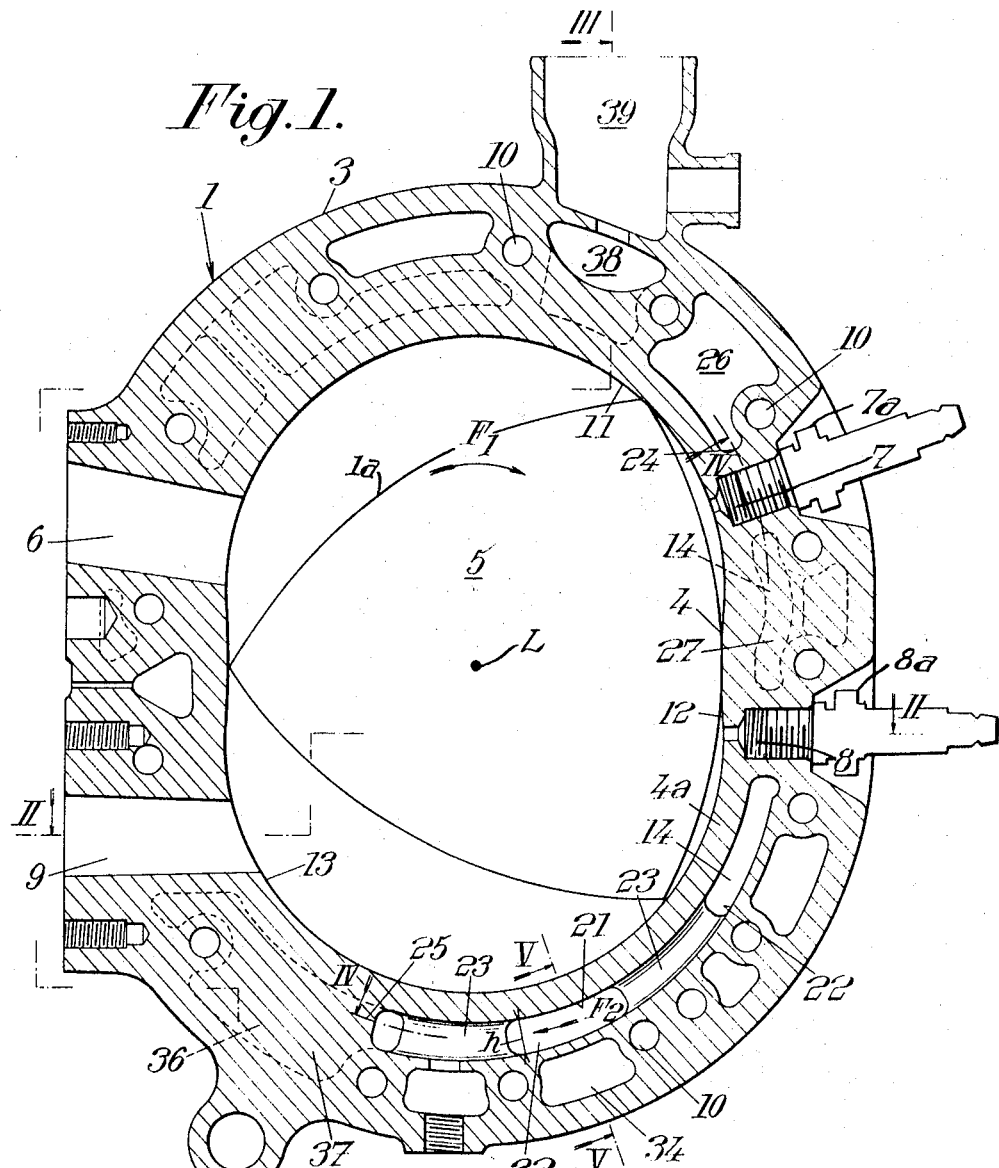
FIG. 1 represents, in section along I—I of FIG. 3, an envelope of a casing of a rotary piston internal combustion engine, constructed in accordance with this invention.

The envelope 1 is limited by two cylindrical surfaces, of generatrixes normal to the plane of FIG. 1: an exterior surface 3 and an interior surface 4 whose right section through the plane of FIG. 1 has the form of a trochoid having two arcs.

The interior surface 4 of the interior wall 4a of the envelope 1 and the cheeks 2 delimit a space 5 in which is disposed a rotary piston 1a having three arcs which, by cooperating with the surface 4, divides the space 5 into chambers whose volumes vary in the course of rotation of the piston 1a in the direction of the arrow F$_1$, this piston being eccentric with respect to the axis of symmetry L of the space 5.

Several orifices and housings are provided in the envelope 1 in directions substantially normal to the surfaces 3 and 4.

An inlet orifice 6 permits the introduction of an air/fuel mixture into this space 5.

Two housings or wells 7 and 8 are intended to receive spark plugs 7a, 8a.

An exhaust orifice 9 permits the evacuation of the burnt gases.

Longitudinal holes such as 10 are also provided in the envelope 1 in order to permit the passage of assembling means (not shown) for assembling the cheeks 2 on the envelope 1.

A channel for the circulation of liquid, water for example, is provided in the envelope 1 so as to cool a part of the envelope 1, which part has, as interior surface, a zone of the surface 4 limited substantially to an arc 11, 12, 13. The liquid arrives via the cheeks 2, passes into an active part 14 of the circuit at the interior of the envelope 1, while following its periphery (arrow $F_2$ in FIGS. 4 and 6) so as to evacuate the heat received by that envelope, and leaves by the cheeks 2 (FIG. 3).

It is known that, during the operation of a rotary piston internal combustion engine comprising such a casing, the heat fluxes transmitted to the surface 4 are irregularly distributed. To an engine cycle correspond successive strokes which take place always facing the same zones of the surface 4. For a conventional four-stroke cycle: intake, compression, expansion, exhaust, the zones of the surface 4 which correspond to the intake and to the exhaust strokes will practically not be heated, and the corresponding part of the envelope will not need to be cooled energetically. On the contrary, the zone of the surface 4 corresponding to compression and to expansion, that is to say substantially the zone which, in section, extends along the arc 11, 12, 13, will permanently receive large heat fluxes and will have to be cooled by a circulation of liquid. As the density of the heat flux to be evacuated is not uniform on the arc 11, 12, 13, but passes through a maximum near the point 12, variable speeds of circulation of the liquid are provided as a function of the heat flux density to be evacuated, so as to reduce the thermal stresses by limiting the temperature differences in the envelope. Since the flow rate Q of the cooling liquid is generally constant, the cross sections S for the passage of the liquid are made to vary so as to modify the speed V, the flow rate being connected to these two magnitudes by the relation:

$$Q = V \cdot S$$

for the liquid is considered as incompressible.

For example, since the heat flux density is maximal near the point 12, the speed of the liquid in the region of this point should be maximal in order to facilitate the thermal exchanges, and the cross sections should be minimal. Thus, with the same difference between the temperatures of the envelope and of the liquid at the point 12 and at the point 11, more heat can be evacuated at the point 12 than at the point 11 since the liquid circulates faster at the point 12.

However, if one were content with such an arrangement, one would obtain a cooling circuit which could operate in conditions of thermal exchange which were not safe, as will now be explained.

Figure 8:
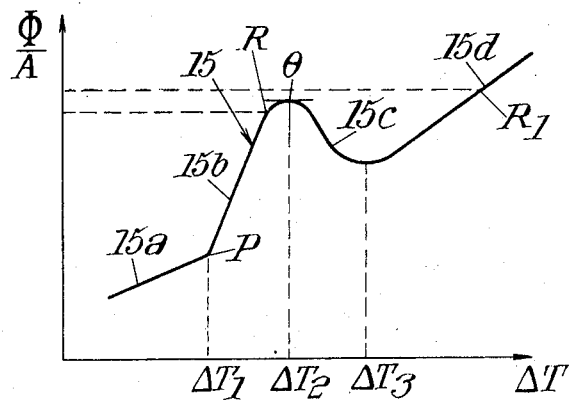
FIG. 8 shows a graph, in logarithmic rectangular coordinates, of the curve representing the variations of transmitted flux density $\Phi/A$ as a function of the temperature difference $\Delta T$.

A liquid at constant static pressure $\pi$, at a substantially constant temperature lower than the temperature of ebullition of the liquid under the pression $\pi$, circulating in contact with a hot wall at a constant speed, exchanges heat with that wall according to a determined law which has already been described and which is represented in FIG. 8 by a curve 15 in solid lines. It is recalled that, in a system of logarithmic coordinates, the abscissa represents the temperature differences $\Delta T$ between the hot wall and the liquid in contact, and the ordinate represents the densities of transmitted flux $\Phi/A$.

The first part of the curve 15, corresponding to heat exchange by convection, is constituted by an arc 15a whose points have abscissas smaller than $\Delta T_1$, the abscissa of the point P.

The second part, corresponding to heat exchange by nuclear ebullition, is constituted by an arc 15b between the point P and the point $\theta$ of abscissa $\Delta T_2$.

The third part, corresponding to a transition, is constituted by an arc 15c whose points have abscissas between $\Delta T_2$ and $\Delta T_3$.

The fourth part, corresponding to heat exchange by film vaporization, is constituted by an arc 15d whose points have abscissas greater than $\Delta T_3$.

The first two parts of this curve will now be considered more particularly.

Figure 9:
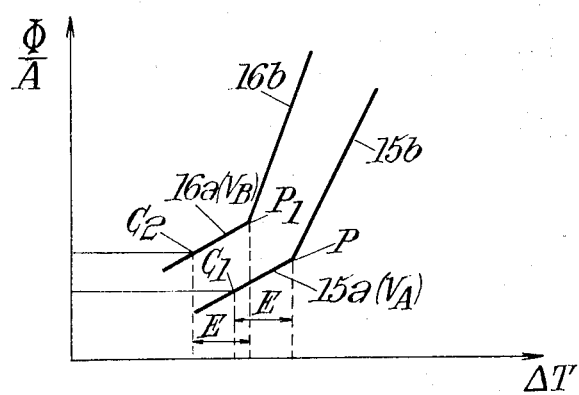
FIG. 9 represents two portions of curves analogous to that of FIG. 8, these two portions being in the neighborhood of the point P for different speeds and pressures of the liquid.

As long as the temperature of the liquid remains lower than the temperature of ebullition of that liquid under the pression $\pi$, which corresponds to normal operation of the cooling circuit, the first part 15a of the curve depends above all on the speed of circulation of the liquid in contact with the hot wall. For example, when the speed of circulation of the liquid increases and passes from a value $V_A$ to a higher value $V_B$, the part 15a is shifted in the direction of increasing densities of transmitted flux, that is to say in the direction of increasing ordinates, and, as represented in FIG. 9, one passes from the part 15a to a part 16a. When the speed of the liquid decreases, the shift takes place in the opposite direction. If the speed of circulation of the liquid remains constant, the variations of temperature or of pressure of the liquid (within the limits defined hereabove) will practically not modify the part 15a of the curve.

The second part 15b depends above all on the difference between the state of the liquid and the state of ebullition of this same liquid. In order to measure this difference, one can use either the temperature or the pressure of the liquid, since these two parameters are connected to the ebullition.

For example, if the static pressure $\pi$ of the liquid remains constant and equal to $\pi_o$, the condition of ebullition of the liquid under this pressure $\pi_o$ can be defined by the equality of the temperature T of the liquid and the temperature of ebullition $T_e$ of the liquid under the pressure $\pi_o$. $T_e$ is the temperature for which the saturation vapor pressure of the liquid is equal to $\pi_o$. The difference between the state of the liquid and the state of ebullition can be expressed by the difference $T_e - T$ (T being lower than $T_e$). When $T_e - T$ decreases as a consequence of an increase of T, the part 15b shifts in the direction of increasing ordinates and one passes from the part 15b to a part 16b, as represented in FIG. 9.

But if the temperature of the liquid remains constant and equal to $T_o$, the condition of the ebullition of the liquid at this temperature $T_o$ can be defined by the equality of the static pressure $\pi$ of the liquid and the ebullition pressure $\pi_e$ of the liquid at the temperature $T_o$. This pressure $\pi_e$ corresponds to the saturation vapor pressure of the liquid at the temperature $T_o$. In order that the fluid considered be in the liquid state, it is necessary that its pressure $\pi$ be higher than $\pi_e$. The difference between the state of the liquid and the state of ebullition can be expressed by the difference $\pi - \pi_e$. When $\pi - \pi_e$ decreases as a consequence of a decrease of $\pi$, the part 15b shifts in the direction of increasing ordinates and one can also pass from 15b to 16b (FIG. 9). It will be seen later on that the liquid considered stays at a substantially constant temperature. It is thus preferable to choose, as the parameter defining the part 15b, the static pressure $\pi$ of the liquid which is variable from one point to another of the cooling circuit.

Any variation of speed not accompanied by a variation of pressure or of temperature of the liquid remains without substantial influence on the part 15b.

Nevertheless, when the incompressible liquid circulates in a channel, under steady state conditions and with linear flow, (that is to say, at any point in a cross section of the channel, the speed, pressure and specific mass of the liquid have respectively the same value), the expression of the principle of conservation of energy permits a relation to be established between the speed V and the pressure $\pi$ of the liquid at a point of altitude Z. In most cases, this relation can be simplified to give the theorem of Bernoulli which applies between two points A and B of a common fluid stream, sufficiently near to one another that one can neglect the losses of pressure head between A and B:

$$Z_A + \frac{\pi_A}{\bar{\omega}} + \frac{V_A^2}{2g} = Z_B + \frac{\pi_B}{\bar{\omega}} + \frac{V_B^2}{2g}$$

$Z_A, \pi_A, V_A$ being the altitude, the pressure and the speed at A,
$Z_B, \pi_B, V_B$ being the altitude, the pressure and the speed at B;
g being the acceleration of gravity;
$\bar{\omega}$ being the weight per unit volume of the liquid.

The same notations are used here as before for the speeds $V_A$ and $Z_B$.

It is of course assumed there is neither a receiver nor a generator of energy between A and B.

Practically, for the circuits considered, one can neglect the variations of altitude and write:

$$\frac{\pi_A}{\omega} + \frac{V_A^2}{2g} = \frac{\pi_B}{\omega} + \frac{V_B^2}{2g}$$

As $V_B$ has been assumed to be higher than $V_A$, $\pi_B$ is lower than $\pi_A$ and, in this case, an increase in the speed will favour the thermal exchanges both on the curve part 15a and on the part 15b, so that one can pass from the pair 15a–15b to the pair 16a–16b when the speed passes from $V_A$ to $V_B$ (FIG. 9).

The curve 15 (FIG. 8) permits one to understand why it is dangerous to operate at a point R situated on the second part 15b of the curve, in the neighborhood of the point of horizontal tangency θ. If a slight increase of the heat flux to be transmitted, hence of the flux density, appears when one is operating at the point R, a local heating will be produced such that the flux transmitted becomes equal to the flux to be transmitted, and one will pass, for example, from the point R to a point $R_1$ situated on the part 15d. A slight increase of the heat flux transmitted is accompanied by a large increase of the temperature difference, which leads to a danger of large thermal stresses.

As has already been stated previously, if one were content to vary the speeds of circulation of the cooling liquid as a function of the local fluxes to be transmitted, one could decrease, during normal operation, the thermal stresses but such an arrangement is unsafe for dangerous thermal stresses can occasionally appear locally.

In order to remedy this disadvantage, in accordance with the principal feature of this invention, one determines, in a cooling circuit of the type in question, while taking into account the characteristics of the liquid, the pump and the radiator, the successive cross sections of the active part 14 of the circuit, inside the envelope 1 of the casing such that, during normal operation, at any cooled point of the envelope, the thermal exchanges are effected substantially by convection and such that preferably the temperature difference between the envelope 1 of the casing and the liquid is, at each point of the envelope, smaller by a substantially constant value E than the temperature difference corresponding to the passage from heat exchange by convection to heat exchange by nuclear ebullition (point P).

This constant value E is preferably between 10° and 20° C.

Figure 10:
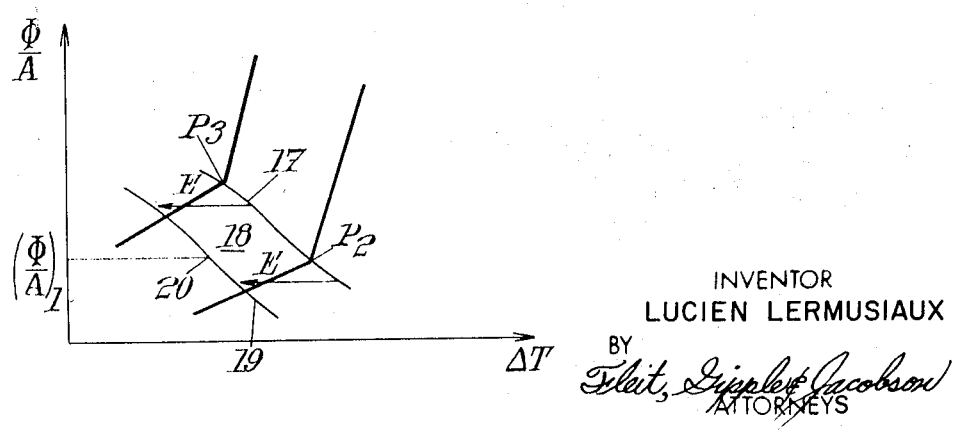
FIG. 10 represents a family of portions of curves analogous to those in FIG. 9.

For a given liquid, of known weight per volume, circulating at constant temperature in a channel, since the speed and the pressure of the liquid are connected by the theorem of Bernoulli, one can draw, as represented in FIG. 10, a family of curves of thermal exchange, the speed of the liquid being constant for each curve (but different from one curve to another). The locus of the various points P, $P_1$, $P_2$, $P_3$ is a curve arc 17 limiting in the quadrant a region 18 corresponding to heat exchanges by convection.

With a good approximation, one can consider that, in cooling circuits of the type concerned, the temperature of the liquid is constant. The family of FIG. 10 is drawn at this temperature.

Taking into account the characteristics of the liquid, the pump and the radiator, and in particular the flow rate of the liquid, one determines practically the successive cross sections of the active part of the circuit at the interior of the envelope 1 of the casing, for normal operation and for any cooled point of the casing, that is to say for any point in the zone 11, 12, 13, in the following manner.

The constant value E is chosen. Then a curve 19 (FIG. 10) is drawn whose points are deduced from those of the curve 17 by translations parallel to the abscissa axis, in the opposite direction from the amplitude E. It is obvious that, since the abscissa is graduated in proportion to the logarithms of the temperature difference, the geometric amplitude of the translation varies as a function of the abscissa, but the curve 19 is perfectly determined from the curve 17 and from E. Furthermore, any point of this curve 19 corresponds to a well determined speed and the curve 19 can thus be graduated in speeds of the liquid.

At a point of the arc 11, 12, 13 of the zone to be cooled, the flux density $(\Phi/A)_1$ to be evacuated is known, this density depending on the characteristics of the engine.

In FIG. 10, a line of ordinate $(\Phi/A)_1$ is drawn parallel to the abscissa axis, this line cutting the curve 19 at a point 20 to which corresponds the speed V of the liquid, which speed is to be determined for the region considered.

Knowing the flow rate Q of the cooling liquid and the speed V, necessary for the temperature difference between the envelope of the casing and the liquid to be smaller by the value E than the temperature difference corresponding to the passage from heat exchange by convection to heat exchange by nuclear ebullition, this passage being represented by the point P (more generally by the locus 17 of the points P), the cross section S of the active part 14 is determined at the point considered by the quotient: $S=Q/V$.

Two points of the arc 11, 12, 13, for which the densities of the heat flux to be evacuated are different, will have points representative of the thermal exchanges $C_1$ and $C_2$ (FIG. 9) whose abscissas will be smaller by the value E than the abscissas corresponding to the changes from convection to nuclear ebullition (FIG. 9).

By determining the successive cross sections of the active part 14 in this manner, a circuit is obtained which operates under secure conditions at any point of the part 14; for, at any point of the circuit, a local increase in the temperature difference greater than E (E being about 10° to 20° C.) will make the thermal exchange pass from convection (15a) to nuclear ebullition (15b) having a steep positive slope. To a large increase of transmitted flux will correspond only a small increase in the temperature difference between the hot wall and the liquid.

In addition to the feature which has just been described, the following feature is preferably also used.

The interior active part 14 is arranged in the form of a passage provided in the envelope 1 of the casing, in the neighborhood of its interior surface 4, and between two cylindrical surfaces 21, 22, the first of which 21 is substantially parallel to the interior surface 4, and the second of which 22 surrounds the first 21 at a distance h depending on the passage cross section, the two surfaces being joined together by ribs 23 which are substantially parallel to the mean plane perpendicular to the generatrixes of the cylindrical surfaces 21 and 22, these ribs 23 being disposed in quincunx (staggered) with respect to that plane, the cheeks 2 limiting the passage laterally.

The development of the cooling circuit (FIG. 4, in section along IV—IV of FIG. 1), between points 24–25 (FIG. 1), shows the staggered disposition of the ribs 23 with an angle of rake A as shown in FIG. 4, preferably equal to 3°. The cooling liquid circulates substantially along the entire width L (FIGS. 3 and 4) of the envelope 1 in the direction indicated by the arrow $F_2$. It penetrates via the lateral cheeks 2 into a cavity 26 marking the beginning of the active part 14 in the interior of the envelope. It will be noted that the cooling liquid can circulate in the direction opposite to that of the arrow $F_2$ without substantially modifying the operation of the cooling circuit as far as the thermal exchanges are concerned.

Figure 2:
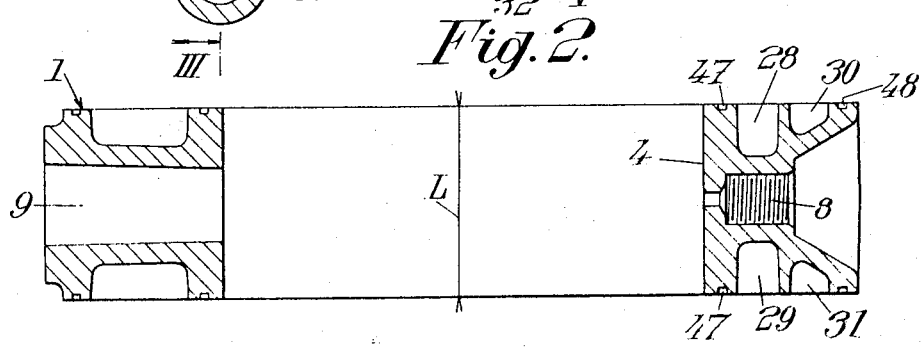
FIG. 2 represents the envelope of FIG. 1, in section along II—II of FIG. 1.

The liquid passes around the spark plug wells 7 and 8 joined together by a central rib 27. The heat flux is large at the level of these spark plugs, and consequently, the speed of the liquid must be high there and the cross section small. In FIG. 2, two elementary cross sections can be seen which are approximately in the form of rectangles 28 and 29 which constitute the cross section for the passage of the liquid in this region. Two cavities 30 and 31 of cross section substantially in the form of a rectangular trapezium and situated respectively between the cross sections 28 and 29 and the exterior surface 3, are intended to lighten the envelope 1 but the liquid does not circulate there. The cross sections 28 and 29 and the cavities 30 and 31 open laterally on the flancs of the envelope and are closed by the cheeks 2.

The normal passage offered to the liquid is constituted by two cross sections 32 and 33 (FIG. 5), unequal, by reason of the offset of the rib 23 with respect to the mean plane of the envelope, these cross sections being limited laterally by the cheeks 2 (FIG. 3). Grooves 47 and 48 are provided for receiving seals (not shown). In the volume of material comprised between the surfaces 22 and 3, cavities 34 (FIGS. 1 and 5) and 35 (FIG. 5) are provided for lightening the envelope. The cross sections of these cavities in the plane V—V of FIG. 1 are substantially rectangular, as visible in FIG. 5, and are disposed identically to the cross sections 32 and 33 so as to permit the rib 23 to be prolonged radially. The cross sections of these cavities 34 and 35 in the plane I—I of FIG. 3 are substantially in the form of a trapezium, as visible in FIG. 1. Circulation of liquid is not provided in these cavities.

The cross section 32–33 for the passage of the liquid, corresponding to the plane of the section of FIG. 5, is greater than the cross section 28–29 (FIG. 2), for the flux density to be transmitted is smaller at the level of the cross section 32–33.

It will be noted that the staggered disposition of the ribs 23 contributes to give good bending resistance to the envelope 1 and avoids the separation of the fluid current into two independent streams, which would result from a continuous central rib.

The active part 14 of the circuit ends by a chamber 36 having a central rib 37. The cross section for the liquid of the chamber 36 is the greatest, for the flux density to be evacuated there is the smallest.

By way of example, the cross sections for the liquid increase progressively from a value of 4 cm.$^2$ in the zone of the spark plug wells 7 and 8 to a value of 8 cm.$^2$ at the inlet of the chamber 36.

The liquid leaves the chamber 36 laterally via the cheeks 2 and returns in countercurrent (see FIG. 3) towards the outlet chamber 38, situated in the envelope 1, whence it leaves towards the radiator via an orifice 39.

A sufficient interval, preferably about 10 mm., is provided along the line of development, between the terminal corner 40 (FIG. 4) of the last staggered rib 23 (direction of the arrow $F_2$) and the initial corner 41 of the central rib 37 of the outlet chamber 36, so as to avoid pronounced braking of the liquid between these two corners 40–41 and to reunite downstream of the corner 40 the two streams of liquid which were separated at the level of the inlet corner 43 of the last rib 23 (FIG. 4).

As a consequence of the staggered disposition of the ribs in the region of the envelope subjected to high pressures, the bending resistance of the wall is good, as has already been stated, and the thickness of that wall is relatively small and constant.

Nevertheless, in the zone of the spark plug wells 7 and 8, by reason of the central disposition of the rib 27, the bending resistance would be smaller if the wall did not have a greater thickness 44, as shown in FIGS. 6 and 7.

It will be noted that facing this overthickness, in order to respect the law of the cross sections, the surface 22 is maintained parallel to the surface 21 (FIG. 6).

It will also be noted that the spark plug wells 7 and 8 cause a decrease in the width of the passage for the liquid (see FIG. 4).

In order to compensate for this decrease and to maintain the law of variation of the cross sections, the height of the passage offered to the fluid is increased by separating further in the radial direction the surfaces 21 and 22 in regions such as 45 and 46 (FIG. 6).

The holes 10 are advantageously disposed outside the active part 14 of the circuit.

It can be seen from the foregoing that the present invention provides a cooling circuit which permits secure conditions of thermal exchange to be obtained in a simple, economic and rapid manner, such that, at any point of the circuit, a large increase in the heat flux transmitted corresponds to a small increase in the temperature difference $\Delta T$ between the hot wall and the cooling liquid.

What is claimed is:

1. A rotary piston internal combustion engine in which a peripheral envelope and lateral cheeks form a casing for the piston, said envelope having inner and outer surfaces and having at least one active part through which relatively high heat fluxes have to be removed, at least one passage for flow of a liquid coolant therethrough being arranged between said inner and outer surfaces so as to traverse at least one said active part of the envelope, said passages having successive sections of predetermined cross-sectional areas in said active parts, said cross sections being predetermined from the heat flux characteristics of the coolant liquid, so that under normal operating conditions thermal exchange at any cooled point of the envelope takes place under conditions of convection and so that the temperature difference between the envelope and the liquid is smaller by a substantially constant value than the temperature difference corresponding to transition from said convection conditions to thermal exchange under substantially nuclear ebullition conditions, wherein said passage is arranged in the neighborhood of said inner surface, and comprised between two cylindrical surfaces, the first of which is substantially parallel to said inner surface, and the second of which surrounds the first at a distance depending on the cross section of the passage, said two cylindrical surfaces being connected together by ribs which are substantially parallel to the mean plane perpendicular to the generatrixes of said cylindrical surfaces, said ribs being disposed in staggered relation with respect to said plane, said cheeks limiting said passage laterally.

2. A rotary piston engine according to claim 1, wherein the substantially constant value is between 10° and 20° C.

3. An envelope adapted to form part of a rotary piston engine according to claim 1, further comprising holes adapted for the passage of fastening means for fastening said cheeks to the envelope, these holes being situated radially outside said active part of the envelope.

4. A rotary piston engine according to claim 1, wherein said inner surface has a profile in the form of a trochoid having two lobes, the rotary piston having a transverse cross section in the form of a curvilinear triangle.

5. A rotary piston engine according to claim 4 comprising at least one spark plug, said envelope defining a well extending radially and housing said spark plug in the casing, wherein, in said active part, in the region of the spark plug well, the cross section of the passage for the coolant liquid is of increased area, said cylindrical surfaces being more separated radially in order to compensate for the loss in cross-sectional area of the passage due to the presence of said spark plug well.

6. A rotary piston engine according to claim 5 comprising two spark plugs, wherein a central rib connects the two cylindrical surfaces between the spark plug wells, and wherein, in order to compensate for the decreased strength of the envelope in the region of this central rib, the inner surface of the envelope is supported by a wall of increased thickness.

* * * * *